United States Patent [19]

Cram

[11] 3,769,132

[45] Oct. 30, 1973

[54] METHOD OF INTIMATELY BONDING THERMOPLASTICS

[75] Inventor: Robert Dana Cram, Ipswich, Mass.

[73] Assignee: High Voltage Engineering Corporation, Burlington, Mass.

[22] Filed: Nov. 6, 1969

[21] Appl. No.: 874,515

[52] U.S. Cl. .................. 156/286, 156/309, 156/311, 117/119

[51] Int. Cl. .......................................... B29c 27/14

[58] Field of Search .................... 156/311, 285, 286, 156/306; 161/252; 117/138.2 E, 119 L

[56] References Cited

UNITED STATES PATENTS

| | | | |
|---|---|---|---|
| 2,766,809 | 10/1956 | Parham | 156/311 |
| 2,936,261 | 5/1960 | Cole | 161/252 |
| 3,035,958 | 5/1962 | Wilkins | 156/311 |
| 3,380,870 | 4/1968 | Pouncy, Jr. | 117/138.9 E |
| 3,074,466 | 1/1963 | Little | 156/104 |
| 3,385,722 | 5/1968 | Weaver et al. | 156/311 |
| 3,508,944 | 4/1970 | Henderson et al. | 161/252 |
| 3,149,017 | 9/1964 | Ehrreich et al. | 161/252 |

FOREIGN PATENTS OR APPLICATIONS

| | | | |
|---|---|---|---|
| 653,211 | 5/1951 | Great Britain | 156/311 |

*Primary Examiner*—Reuben Epstein
*Attorney*—Francis J. Thornton and Irwin A. Shaw

[57] ABSTRACT

A process for intimately bonding a conducting or semiconducting thermoplastic layer to a non-conducting thermoplastic substrate. The bond achieved between the two thermoplastic layers is devoid of gas and is particularly adaptable to high voltage insulation and capacitor applications.

12 Claims, 1 Drawing Figure

PATENTED OCT 30 1973 3,769,132
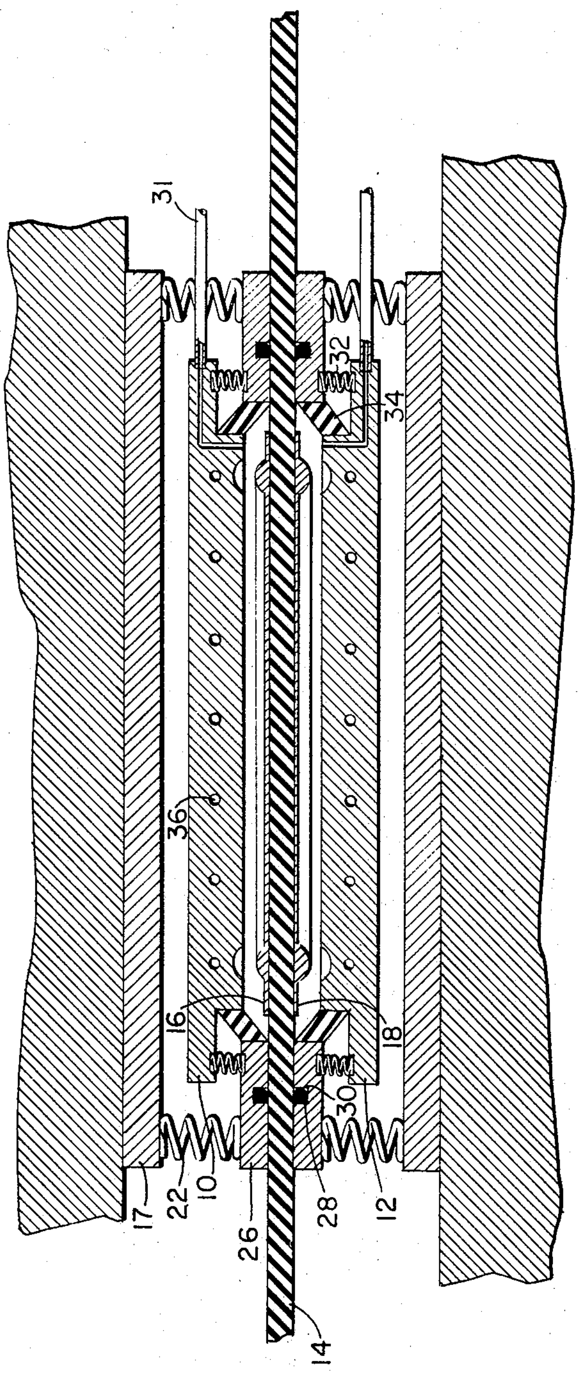
INVENTOR
ROBERT D CRAM
BY
ATTORNEY

METHOD OF INTIMATELY BONDING THERMOPLASTICS

BACKGROUND OF THE INVENTION

This invention relates, in general, to a process for bonding different types or kinds of thermoplastics and, more particularly, to the bonding of a layer of conducting or semiconducting thermoplastics to a substrate of nonconducting thermoplastics.

In many high voltage applications, an insulation layer is required which will reliably withstand high voltage gradients in the order of 300 volts per mil or greater. Under such conditions it has been found to be highly desirable to bond a conducting or semi-conducting surface which serves as an electrode on opposing surfaces of a substrate while minimizing eddy current heating under fluctuating magnetic fields. For example, between core segments of insulated core-type induction apparatus, the core segments are separated by an insulating layer having a high dielectric strength which for electrostatic and electromagnetic reasons requires a semi-conducting coating on opposing surfaces.

Previous attempts at such a bonding have been unsuccessful because, either air voids existed between the substrate and the conducting or semi-conducting layer or a fusion of the substrate and conducting or semiconducting layer occured whereby the substrate was impregnated throughout with conducting particles. Under the former condition, the air present in the voids would rapidly ionize under transient conditions and would initiate a surface breakdown or corona; in the latter condition, the dielectric of the substrate would be severely and adversely affected. Moreover, additional problems have occurred due to poor mechanical strength and adhesion of the substrate to the conducting or semiconducting layer which have resulted in peeling or separation, and electrical tracking caused by particles being pulled from the conducting or semiconducting layer by severe electrostatic fields.

SUMMARY OF THE INVENTION

It is, therefore, a general object of the present invention to provide a new and improved method for bonding layers of thermoplastics.

Another object of the present invention is to provide a new and improved method for bonding a layer of conducting thermoplastic to a nonconducting thermoplastic substrate.

A further object of the present invention is to provide a new and improved method for bonding thermoplastic layers wherein the substrate may have an irregular geometry.

Yet another object of the present invention is to provide a new and improved method for bonding thermoplastic layers wherein the bonding process can assure no voids between layers.

In accordance with the general principles of the present invention, a layer of conductively loaded thermoplastic is applied either by spray or in a sheet form to the non-conducting thermoplastic substrate. The combination is then heated to a temperature greater than the softening point of the conducting thermoplastic layer but somewhat less than that of the substrate. A vacuum may be desired within the heated chamber to eliminate air voids in the bonding process. A pressure is maintained on the layers for a predetermined time to achieve a proper and permanent bond.

Other objects and advantages of the present invention will become apparent in view of the following description when taken in conjunction with the accompanying drawings.

DESCRIPTION OF THE DRAWINGS

The single FIGURE illustrates apparatus suitable for bonding of thermoplastic layers in its initial or unbonded condition.

DESCRIPTION OF THE PREFERRED EMBODIMENT

Referring now to the FIGURE, apparatus is shown for bonding a conducting or semiconducting layer of thermoplastic to a thermoplastic substrate. More particularly, the apparatus consists generally of an upper platen 10 and a lower platen 12 to which pressure is applied by and through pressure plate for bonding outer thermoplastic layers 16 and 18 to the substrate 14. The apparatus is identical above and below the substrate 14 and the associated layers 16 and 18 and the following description applies equally well to both.

The substrate 14 and conducting or semiconducting layers 16 and 18 are inserted between the platens 10 and 12. The substrate may take the form of a flat sheet or may have an irregular geometry depending upon the shape of the platen 10 and 12 as shown in the FIGURE. An outer ring 26 rests on the surface of the substrate 14 and enclosed the surface which is to be acted upon. When a vacuum is required an O-ring 28, inserted within the circumferential groove 30, provides proper sealing. Vacuum is achieved by a tube 31 mounted within the outer ring 26 which connects to a vacuum pump (not shown) on one end and admits to the region between platen 10 and the substrate 14 on the other.

The platen 10 is suspended on the outer ring 26 by a series of strategically placed spacing springs 32. A thermal insulating ring 34 typically of silicone rubber connects a circumferential portion of the platen 10 so as to form an interior chamber in which the substrate and thermoplastic layers may be bonded. The platen 10 has mounted therewithin a spiral cooling channel 36 for circulating a fluid to cool the platen 10 which also may act as a channel for heating the platen 10. Suitable heating can be achieved by fluid circulation to the spiral channel 36 or by any of the known electric or induction type heating systems. A press plate 17 is suspended above the platen 10 by a series of springs 22.

As previously mentioned, the bonding of the conducting or semiconducting coating 16, 18 to the substrate 14 may be achieved either by spraying of a solution layer 16 on the substrate 14 or else by placement of a conducting or semiconducting sheet 16, 18. In the former case, a piece of high density, non-conducting thermoplastic was placed within the outer rings 26 having been previously sprayed on both sides by one or more coatings of a conducting or semiconducting solution having a predetermined resistivity, or a predetermined thickness which will determine the resistivity. The pressure plate 17 is then depressed transmitting force through the springs 22 so as to depress the outer ring 26 and thereby cause the O-ring 28 to provide proper sealing. The enclosed chamber is then evacuated through tube 31 removing the atmosphere both above the sheath 16, 18 and in between the substrate and sheath 16, 18 such that air voids are eliminated.

The platens 10 and 12 are then heated as previously described until a temperature somewhat greater than the softening temperature of the sprayed on conductive coating 16, 18 but below the melting point of the substrate 14 is achieved. This temperature and a predetermined pressure is maintained for a period of time sufficient to cause the bonding of the respective layers. Following the application of heat and pressure, heating is discontinued and cooling is initiated such as by circulating cool water through the spiral channel 36 to cool the platens 10 and 12 and the now bonded workpiece still maintaining the pressure. The workpiece may later be annealed to draw out any stress intensification and to inhibit warping.

The latter method of bonding is achieved by placing a sheet of thermoplastic such as carbon-loaded polyethylene or vinyl on opposite sides of the substrate 14 and then inserting the substrate 14 in sheets 16, 18 between the outer rings 26 as before. The pressure plate 17 is then depressed transmitting force through the springs 22 so as to depress the outer ring 26 and thereby cause the O-ring 28 to provide proper sealing. The enclosed chamber is then evacuated through tube 31 removing the atmosphere both above the sheath 16, 18 and in between the substrate and sheath 16, 18 such that air voids are eliminated. As previously, heating is applied through the spiral channel 36 to a temperature somewhat above the softening temperature of the sheaths 16, 18 but below the melting point of the substrate 14. This heat is applied for a time sufficient to bond the layers and is cooled in the same manner as previously described. It should be noted that when either the softening temperature of the substrate and the applied layer are reasonably close such that they would react unfavorably, one of the two layers may be cross-linked either chemically or by ionizing radiation to increase the softening or melting temperature. This may have a significant advantage in high voltage application wherein the insulating medium will be operating at a rather high ambient.

Although the present invention has been described with a certain degree of particularity, it should be understood that the present disclosure has been made only by way of example and that numerous changes in the detail and the construction and in the process arrangement may be resorted to without departing from the scope and spirit of the present invention.

I claim:

1. The method of manufacturing an insulation layer for high voltage applications capable of reliably withstanding high voltage gradients in the order of at least 300 volts per mil which includes bonding layers of conducting or semiconducting thermoplastic to a non-conducting thermoplastic substrate comprising the steps of:

a. applying a conducting or semiconducting thermoplastic layer onto both surfaces of a non-conducting thermoplastic substrate,
b. pressing the thermoplastic layer to such substrate with a predetermined pressure.
c. heating such thermoplastic layer and said substrate to the softening temperature of said thermoplastic layer but below the melting point of said substrate,
d. maintaining a constant heating and pressurizing to said thermoplastic layers and said substrate for a predetermined time necessary for bonding, and
e. cooling said bonded thermoplastic layers and substrate while maintaining the same constant pressure.

2. The method of bonding layers of thermoplastic to a thermoplastic substrate as set forth in claim 1 wherein said application of a thermoplastic layer is by spraying on a solvent solution.

3. The method for bonding layers of thermoplastic to a thermoplastic substrate as set forth in claim 1 wherein said application of a thermoplastic layer is by placement of a thermoplastic sheet upon said substrate.

4. The method for bonding layers of thermoplastic to a thermoplastic substrate as set forth in claim 3 wherein previous to the step of pressing, a vacuum seal is provided around said substrate and thermoplastic layer in said sealed region is evacuated.

5. The method for bonding layers of thermoplastic to a thermoplastic substrate as set forth in claim 2 wherein said solvent solution has particles to provide layers having a predetermined resistivity.

6. The method for bonding layers of thermoplastic to a thermoplastic substrate as set forth in claim 3 wherein said thermoplastic sheath is impregnated with conducting particles having a predetermined resistivity per square.

7. The method for bonding layers of thermoplastic to a thermoplastic substrate as set forth in claim 1 wherein the softening temperature of the substrate is greater than the softening temperature of the thermoplastic layers.

8. The method for bonding layers of thermoplastic to a thermoplastic substrate as set forth in claim 1 wherein following said cooling, the bonded thermoplastic layers and substrate are annealed to draw out stress concentration and eliminate warping.

9. The method for bonding layers of thermoplastic to a thermoplastic substrate as set forth in claim 1 wherein said thermoplastic layers are carbon-loaded polyethylene.

10. The method for bonding layers of thermoplastic to a thermoplastic substrate as set forth in claim 1 wherein said thermoplastic layers are carbon-loaded vinyl.

11. The method for bonding layers of thermoplastic to a thermoplastic substrate as set forth in claim 1 wherein previous to the applying step, the thermoplastic substrate has been cross-linked to increase its melting point.

12. The method for bonding layers of thermoplastic to a thermoplastic substrate as set forth in claim 1 wherein previous to the applying step, the thermoplastic layers have been cross-linked to increase their melting point.

* * * * *